United States Patent Office 3,213,127
Patented Oct. 19, 1965

3,213,127
CYCLOOCTYL TRICHLOROACETATE
Franklin D. Jones, Ardmore, Pa., and Irving S. Bengelsdorf, Santa Ana, Calif., assignors to United States Borax & Chemical Corporation, Los Angeles, Calif., a corporation of Nevada
No Drawing. Filed Sept. 28, 1962, Ser. No. 227,088
1 Claim. (Cl. 260—487)

This invention relates to the novel compound cyclooctyl trichloroacetate and its method of preparation.

It is therefore, the principal object of this invention to provide, as a new composition, cyclooctyl trichloroacetate. A further object of this invention is to provide a process for preparing the new composition. Other objects will become apparent from the following disclosure.

To the accomplishment of the foregoing and related ends, said invention then comprises the features hereinafter fully described and particularly pointed out in the claim, the following description setting forth in detail certain illustrative embodiments of the invention, these being indicative, however, of but a few of the various ways in which the principle of the invention may be employed.

Broadly stated, the present invention provides as a new composition cyclooctyl trichloroacetate.

The novel compound of this invention which can be represented by the formula $$\text{Cl}_3\text{C}-\text{C}(=\text{O})-\text{O}-\text{CH}(\text{CH}_2\text{CH}_2)_2(\text{CH}_2\text{CH}_2)$$

is a colorless, mobile liquid which is soluble in most organic solvents such as benzene, alcohols and ethers. It is useful as a herbicide or as an active component of herbicidal compositions.

The compound can be prepared by the reaction of trichloroacetic acid with cyclooctene, which can be illustrated by the equation:

$$\text{Cl}_3\text{C}-\text{COOH} + \text{cyclooctene} \rightarrow \text{Cl}_3\text{C}-\text{C}(=\text{O})-\text{O}-\text{cyclooctyl}$$

Although a catalyst is not necessary, preferably a Lewis acid-type catalyst, such a boron trifluoride, aluminum trichloride, sulfuric acid, etc., is used. The reaction temperature is not critical, although, for best yields in a short time, a reaction temperature in the range of about 40° to 70° C. is preferred. An inert solvent medium, such as cyclohexane or an excess of trichloroacetic acid can be used for ease of handling the reactants and control of the reaction temperature. The product is isolated and purified by conventional procedures such as fractional distillation under reduced pressure.

The following example illustrates the preparation of the compound of this invention, but the invention is not to be considered as limited to the particular example.

*Example*

A mixture of 53.6 grams (0.3 mole) of trichloroacetic acid, 16.5 grams (0.15 mole) of cyclooctene and 1 ml. of boron trifluoride etherate was stirred at about room temperature for one hour and then stirred at about 70° C. for one hour. The reaction mixture was cooled to 10° C. and diluted with 100 ml. of diethyl ether. The ethereal solution was neutralized with aqueous sodium hydroxide solution, washed thoroughly with water and then dried over anhydrous magnesium sulfate. Ethyl ether and cyclooctene were removed by distillation under slightly reduced pressure. The residual liquid was distilled through a 6-inch Vigreux colunm and the crude product collected at 72°–100° C./0.2–0.25 mm. Redistillation of the crude product gave 6.67 grams (16.3% yield) of the straw-colored liquid product at 73°–89° C./0.2–0.23 mm. After further purification the compound boils at 81°–87° C./0.2 mm.; $n_D^{25}$ 1.4852.

Alternatively, the compound of this invention can be prepared by the reaction of equimolar amounts of trichloroacetyl chloride and cyclooctanol at a temperature of about 35° to 75° C.

The cyclooctyl trichloroacetate can be formulated and applied to plants according to procedures well known to those skilled in the herbicide art. For example, when a methanol solution of the compound is diluted with water and applied as a pre-emergency treatment, plants are killed at rates of about 15 to 50 pounds of active compound per acre. When applied as a post-emergence treatment, good control is obtained at rates of about 50 to 80 pounds per acre. Additionally, cyclooctyl trichloroacetate can be compounded with other well known organic and inorganic herbicides.

Other modes of applying the principle of the invention may be employed, change being made as regards the details described, provided the features stated in any of the following claim or the equivalent of such be employed.

We, therefore, particularly point out and distinctly claim as our invention:

Cyclooctyl trichloroacetate.

References Cited by the Examiner
UNITED STATES PATENTS

| | | | |
|---|---|---|---|
| 2,875,240 | 2/59 | Braunwarth | 260—487 |
| 3,012,069 | 12/61 | Drysdale | 260—487 |
| 3,077,394 | 2/63 | Josephs | 71—2.6 |
| 3,081,162 | 3/63 | Tischler | 71—2.6 |

OTHER REFERENCES

Zavgorodnii: C. A., vol. 39, p. 3786 (1945).

LORRAINE A. WEINBERGER, *Primary Examiner.*
LEON ZITVER, *Examiner.*